US008576764B2

(12) United States Patent
Nagao et al.

(10) Patent No.: US 8,576,764 B2
(45) Date of Patent: Nov. 5, 2013

(54) COMMUNICATION APPARATUS AND COMMUNICATION CONTROL METHOD

(75) Inventors: Makoto Nagao, Osaka (JP); Nami Takaoka, Osaka (JP); Yasutoyo Shimao, Osaka (JP); Masaaki Kitagawa, Osaka (JP); Shinichirou Adachi, Osaka (JP)

(73) Assignee: Icom Incorporated, Osaka (JP)

( * ) Notice: Subject to any disclaimer, the term of this patent is extended or adjusted under 35 U.S.C. 154(b) by 196 days.

(21) Appl. No.: 12/707,814

(22) Filed: Feb. 18, 2010

(65) Prior Publication Data

US 2010/0208647 A1    Aug. 19, 2010

(30) Foreign Application Priority Data

Feb. 19, 2009  (JP) ................. 2009-037199

(51) Int. Cl.
| | |
|---|---|
| *H04B 7/14* | (2006.01) |
| *H04J 1/10* | (2006.01) |
| *H04J 3/08* | (2006.01) |
| *H04J 3/24* | (2006.01) |
| *H04L 12/66* | (2006.01) |
| *H04L 12/28* | (2006.01) |
| *H04L 12/56* | (2011.01) |

(52) U.S. Cl.
USPC ............ 370/315; 370/349; 370/352; 370/390

(58) Field of Classification Search
None
See application file for complete search history.

(56) References Cited

U.S. PATENT DOCUMENTS

| | | | | |
|---|---|---|---|---|
| 5,152,012 | A | * | 9/1992 | Schwob .................. 455/158.5 |
| 6,111,883 | A | * | 8/2000 | Terada et al. ............... 370/401 |
| 7,190,937 | B1 | | 3/2007 | Sullivan et al. |
| 2006/0067344 | A1 | * | 3/2006 | Sakurai ..................... 370/401 |

FOREIGN PATENT DOCUMENTS

| | | |
|---|---|---|
| JP | 2000307461 | 2/2000 |
| JP | 2006-108823 | 4/2006 |
| JP | 2006186883 | 7/2006 |

OTHER PUBLICATIONS

Notification of Reasons for Rejection issued Sep. 25, 2012 in Japanese Application No. 2009-037199 (3 pages).

* cited by examiner

*Primary Examiner* — Derrick Ferris
*Assistant Examiner* — Kodzovi Acolatse
(74) *Attorney, Agent, or Firm* — Baker & McKenzie, LLP

(57) ABSTRACT

A communication apparatus includes an input unit that inputs names of repeater stations to which the local communication apparatus and a communication counterpart belong respectively, a memory storing identification information of each repeater station, and information needed to set a communication path from the repeater station to another repeater station as communication path setting information associated with the name of the repeater station, an information retrieving section that retrieves identification information of the repeater station, and information needed to set a communication path to another repeater station from the associated information stored in the memory based on the input name of the repeater station, and a communication frame generating section that generates a communication frame including the identification information of the repeater station, and the information needed to set the communication path from the repeater station to which the local communication apparatus belongs to the repeater station of the communication counterpart from a result of the information retrieval.

5 Claims, 16 Drawing Sheets

FIG.4

| GROUP NAME | ZONE CODE | NAME OF TEAMINAL REPEATER STATION | CALL SIGN OF TERMINAL REPEATER STATION | CALL SIGN OF GATEWAY | DOWN-LINK FREQUENCY | OFFSET |
|---|---|---|---|---|---|---|
| GROUP 1 | A | Nb | bbb | cccG | 439.4 | −5 |
| GROUP 1 | A | Nc | ccc | cccG | 439.31 | +5 |
| GROUP 2 | B | Nd | ddd | dddG | 434.12 | −5 |
| GROUP 2 | B | Na | aaa | dddG | 439.27 | −5 |

FIG.6A

| NAME OF RECEIVER TERMINAL REPEATER STATION | NAME OF SENDER TERMINAL REPEATER STATION | CALL SIGN OF RECEIVER RADIO DEVICE | CALL SIGN OF SENDER RADIO DEVICE |
|---|---|---|---|

FIG.6B

| CALL SIGN OF RECEIVER TERMINAL REPEATER STATION | CALL SIGN OF SENDER TERMINAL REPEATER STATION | CALL SIGN OF RECEIVER RADIO DEVICE | CALL SIGN OF SENDER RADIO DEVICE |
|---|---|---|---|

FIG.6C

| CALL SIGN OF LOCAL ZONE GATEWAY | CALL SIGN OF SENDER TERMINAL REPEATER STATION | CALL SIGN OF RECEIVER RADIO DEVICE | CALL SIGN OF SENDER RADIO DEVICE |
|---|---|---|---|

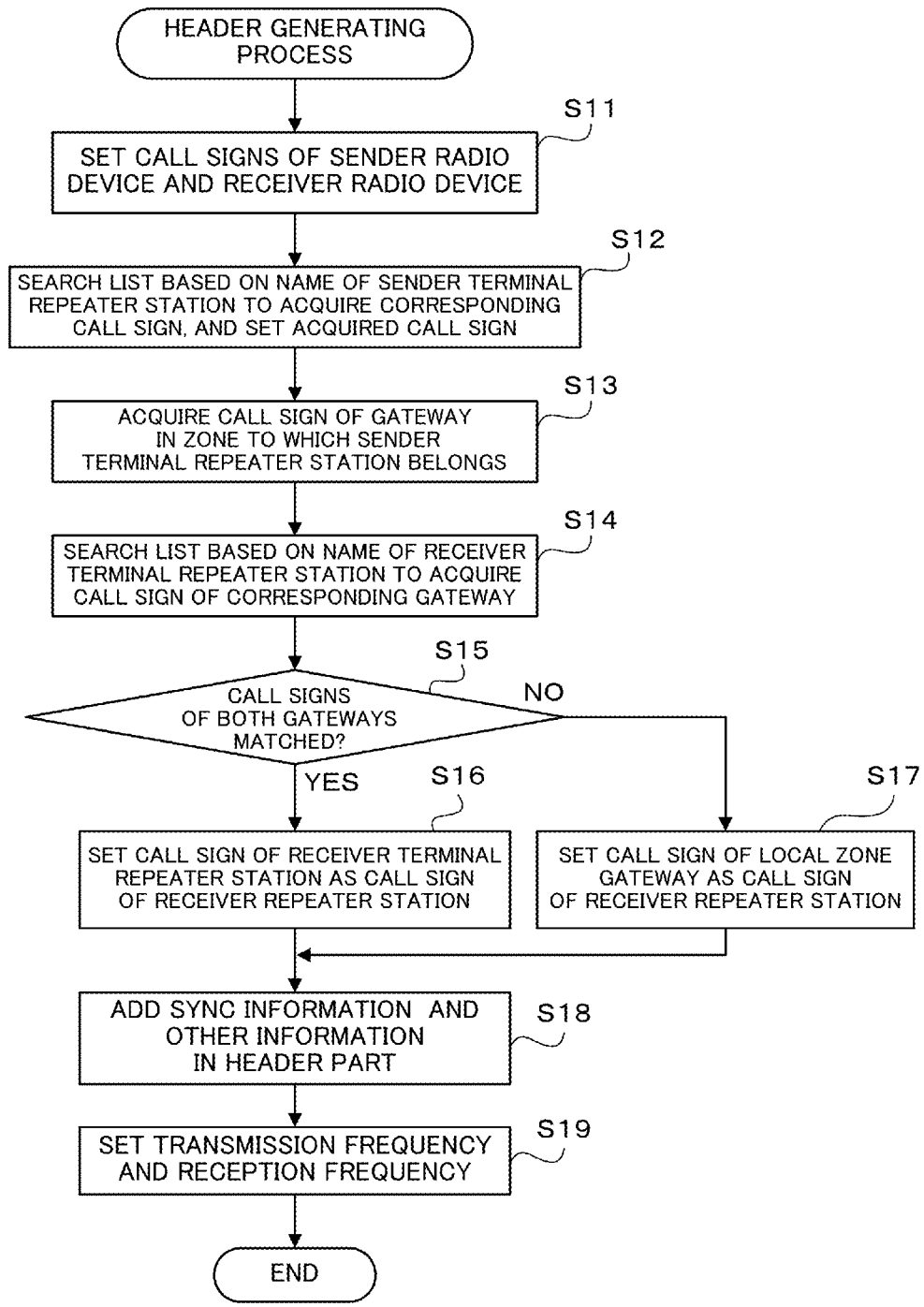

FIG.8A

| NAME OF RECEIVER TEAMINAL REPEATER STATION :Na | NAME OF SENDER TERMINAL REPEATER STATION :Nb | CALL SIGN OF RECEIVER RADIO DEVICE :AAA | CALL SIGN OF SENDER RADIO DEVICE :BBB |
|---|---|---|---|

FIG.8B

| CALL SIGN OF SENDER GATEWAY :cccG |
|---|

FIG.8C

| CALL SIGN OF RECEIVER TERMINAL REPEATER STATION :cccG | CALL SIGN OF SENDER TERMINAL REPEATER STATION :bbb | CALL SIGN OF RECEIVER RADIO EVICE :AAA | CALL SIGN OF SENDER RADIO DEVICE :BBB |
|---|---|---|---|

FIG.8D

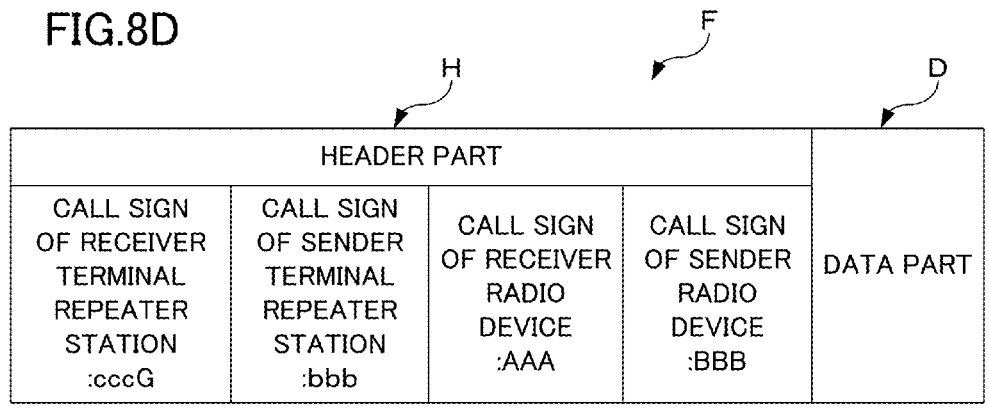

FIG.10A
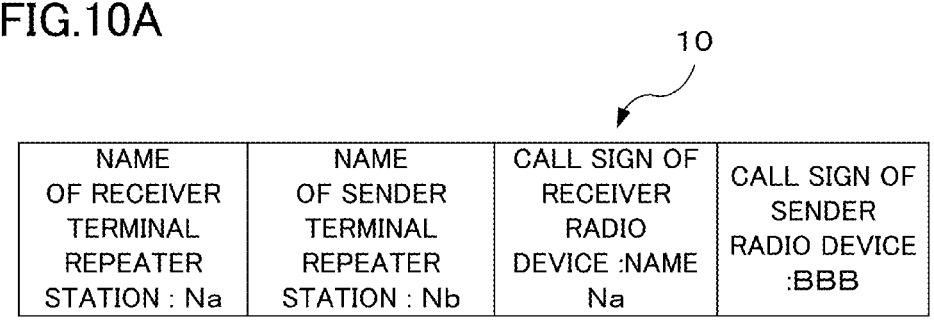
FIG.10B
| CALL SIGN OF RECEIVER TERMINAL REPEATER STATION :cccG | CALL SIGN OF SENDER TERMINAL REPEATER STATION :bbb | CALL SIGN OF RECEIVER RADIO DEVICE :/aaa | CALL SIGN OF SENDER RADIO DEVICE :BBB |
|---|---|---|---|
FIG.10C
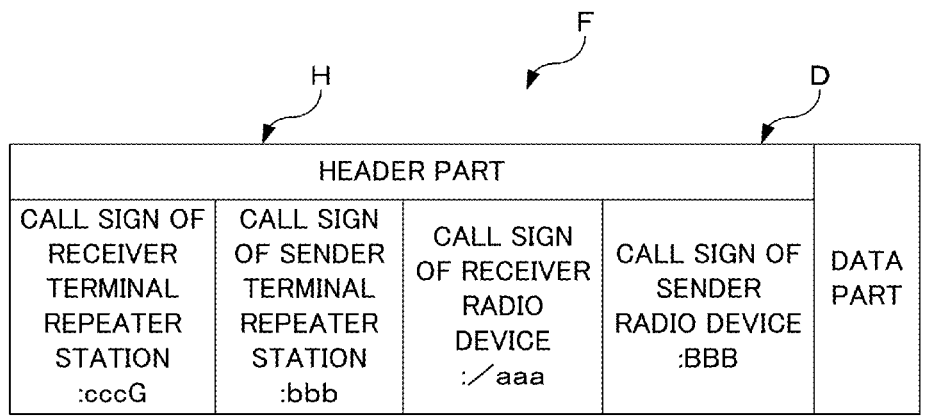

| NAME OF RECEIVER TERMINAL REPEATER STATION : Nc | NAME OF SENDER TERMINAL REPEATER STATION :Nb | CALL SIGN OF RECEIVER RADIO DEVICE :CCC | CALL SIGN OF SENDER RADIO DEVICE :BBB |
|---|---|---|---|

| CALL SIGN OF RECEIVER TERMINAL REPEATER STATION :ccc | CALL SIGN OF SENDER TERMINAL REPEATER STATION :bbb | CALL SIGN OF RECEIVER RADIO DEVICE :CCC | CALL SIGN OF SENDER RADIO DEVICE :BBB |
|---|---|---|---|

FIG.13A

| NAME OF RECEIVER TERMINAL REPEATER STATION :Nb | NAME OF SENDER TERMINAL REPEATER STATION :Nb | CALL SIGN OF RECEIVER RADIO DEVICE :CQCQCQ | CALL SIGN OF SENDER RADIO DEVICE :BBB |
|---|---|---|---|

| CALL SIGN OF RECEIVER TERMINAL REPEATER STATION :bbb | CALL SIGN OF SENDER TERMINAL REPEATER STATION :bbb | CALL SIGN OF RECEIVER RADIO DEVICE :CQCQCQ | CALL SIGN OF SENDER RADIO DEVICE :BBB |
|---|---|---|---|

| HEADER PART (H) | | | | DATA PART (D) |
|---|---|---|---|---|
| CALL SIGN OF RECEIVER TERMINAL REPEATER STATION :bbb | CALL SIGN OF SENDER TERMINAL REPEATER STATION :bbb | CALL SIGN OF RECEIVER RADIO DEVICE :CQCQCQ | CALL SIGN OF SENDER RADIO DEVICE :BBB | |

FIG.15

SELECT IDENTIFICATION INFORMATION OF RADIO DEVICE
TO BE DESIGNATED AS COMMUNICATION DESTINATION

| CALL SIGN<br>OF RADIO DEVICE | CALL SIGN<br>OF CORRESPONDING<br>REPEATER STATION |
|---|---|
| AAA | aaa |
| AAB | aaa |
| ABB | aaa |
| BBB | bbb |
| ⋮ | ⋮ |
| CCC | ccc |
| ⋮ | ⋮ |
| ZZZ | bbb |

[ SET ]    [ CANCEL ]

11a

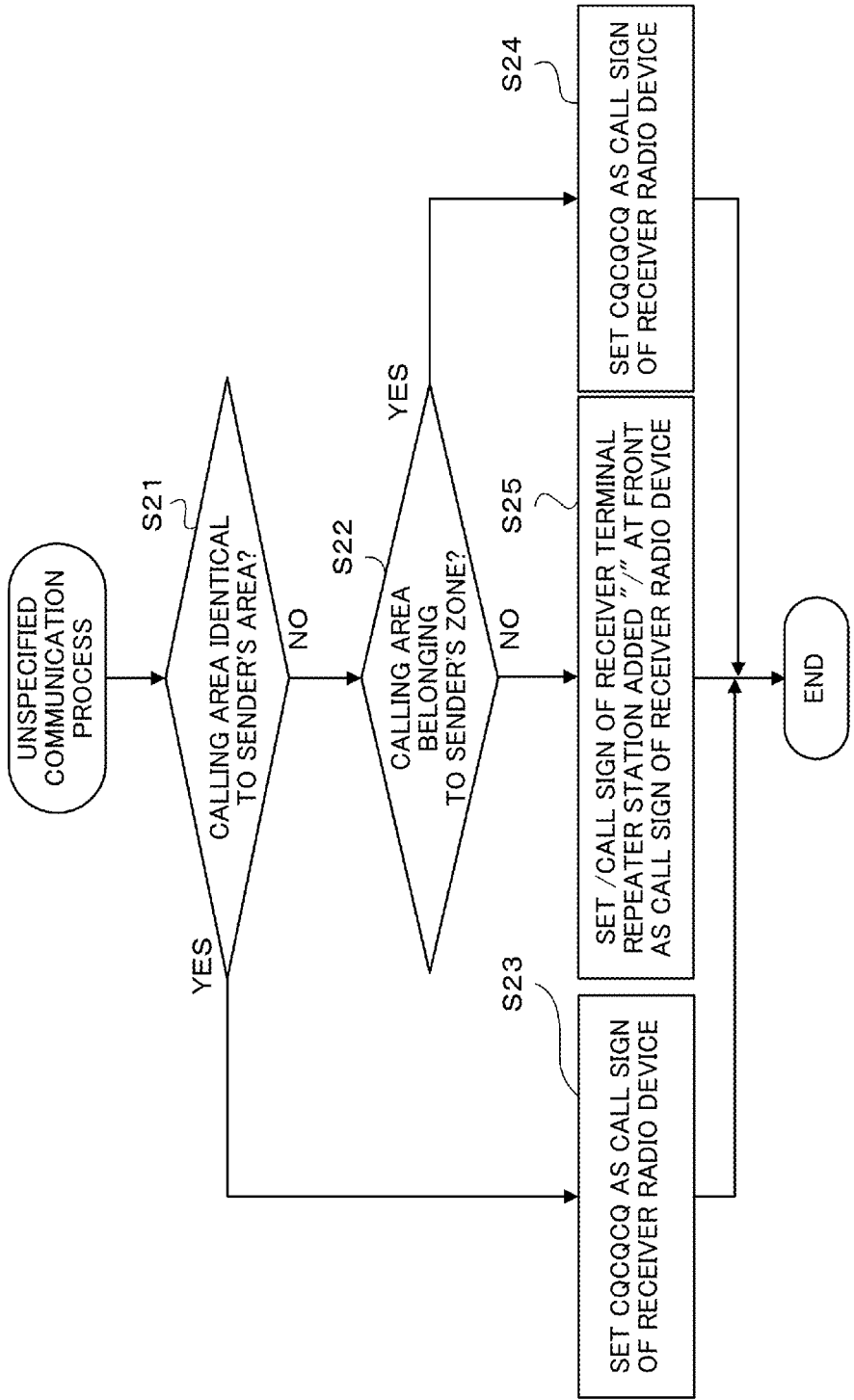

COMMUNICATION APPARATUS AND COMMUNICATION CONTROL METHOD

CROSS-REFERENCE TO THE RELATED APPLICATION

This application claims the benefit of Japanese Patent Application 2009-037199, filed Feb. 19, 2009, the entire disclosure of which is incorporated by reference herein.

FIELD

Present example embodiments relate to a communication apparatus and a communication control method.

BACKGROUND

Unexamined Japanese Patent Application KOKAI Publication No. 2006-108823 describes a communication apparatus configured to communicate among communication apparatuses via a plurality of repeater stations connected to one another over a network and gateways. To communicate with a communication counterpart in this communication system, a user needs to input multiple pieces of information, such as identification information (call sign) of a local communication apparatus, identification information of a transmission destination (communication counterpart), identification information of a repeater station provided on a communication path, and a gateway, and the frequency and radio wave format for communication with the repeater station. Therefore, setting communication path information and other information at the beginning of communication is troublesome to the user. Particularly, call signs or identification information assigned to the local communication apparatus, another communication apparatus, a repeater station, and a gateway are mostly difficult for the user to identify. It is not therefore easy to set the communication path information and other information and is likely to make erroneous inputs.

In this respect, a communication apparatus that intercepts a communication signal exchanged with another communication apparatus, displays identification information of the communication counterpart which is included in the intercepted data, stores the identification information in a storage device, and uses the stored identification information to facilitate the setting has been developed (see Unexamined Japanese Patent Application KOKAI Publication No. 2006-186883).

SUMMARY

However, the communication apparatus disclosed in Unexamined Japanese Patent Application KOKAI Publication No. 2006-186883 can store identification information of only the communication apparatuses and repeaters, requiring that the user should separately set the frequency and radio wave format which are used in communication with the repeater station. Therefore, the process of making the setting is still troublesome.

Further, the communication apparatus disclosed in Unexamined Japanese Patent Application KOKAI Publication No. 2006-186883 merely stores identification information included in the intercepted communication data, and the user should set unintercepted pieces of information in the communication apparatus himself/herself.

In amateur radio, the communication can be executed with a communication counterpart being unspecified. In this communication system, on the other hand, the call sign of a receiver repeater station quite differs depending on whether the area to which the communication counterpart belongs lies within the same area as that of the local communication apparatus, or within the same zone, or in another zone. Accordingly, in case of executing communication with a communication counterpart being unspecified by the amateur radio in this communication system, the call sign of a receiver radio device as well as that of a receiver repeater station differs depending on the area to which the communication counterpart belongs.

With regard to a portable communication apparatus, the repeater station to be a sender may be changed according to the movement of the communication apparatus. In such a case, it is not easy to grasp the communication path between the repeater station changed by the movement and the receiver repeater station.

As apparent from the above, it is not easy and is troublesome to input information necessary for setting a communication path.

The present invention has been made in light of the above situations, and it is an object of the invention to provide a communication apparatus capable of easily inputting information to be set, such as identification information of the communication path.

It is another object of the invention to provide a communication control program capable of easily inputting information to be set, such as identification information of the communication path.

To achieve the former object, according to a first aspect of the invention, there is provided a communication apparatus for use in a communication system capable of communicating among a plurality of communication apparatuses via a plurality of repeater stations, which includes:

an input unit that inputs specific information specifying a repeater station to which the local communication apparatus belongs, and a repeater station of a communication counterpart;

a memory storing identification information of each repeater station, and information needed to set a communication path from the repeater station to another repeater station as communication path setting information in association with the specific information;

an information retrieving section that, upon reception of the specific information, retrieves identification information of the repeater station, and information needed to set a communication path to another repeater station from the communication path setting information stored in the memory, with the specific information being a key; and a communication frame generating section that, upon reception of a retrieval result from the information retrieving section, generates a communication frame including the retrieved identification information of the repeater station, and the retrieved information needed to set the communication path from the repeater station to which the local communication apparatus belongs to the repeater station of the communication counterpart.

It is desirable that the communication path setting information should include information specifying a gateway to which a repeater station associated with the specific information belongs. It is desirable that a gateway determining section should further be included to determine whether information specifying a gateway of a repeater station to which the local communication apparatus belongs matches with information specifying a gateway of a repeater station to which the communication counterpart belongs. It is desirable that the communication frame generating section should insert the identification information of the repeater station of the communication counterpart into the communication frame when the gateway determining section determines that the gateways of the local communication apparatus and the communication counterpart match with each other, and should insert the identification information of the gateway to which the local communication apparatus belongs into the communication frame when there is no match.

It is desirable that the memory should store a name of each repeater station in association with the identification information thereof, and the input unit should input the name of a repeater station as information specifying the repeater station.

It is desirable that the communication path setting information should include a transmission frequency information which is a frequency of a signal used at a time of transmitting information to each repeater station, and when information specifying the repeater station to which the local communication apparatus belongs is input, the information retrieving section should retrieve the transmission frequency information for the repeater station from the communication path setting information, and should set a transmission frequency of the local communication apparatus based on a retrieval result.

When information specifying the repeater station of the communication counterpart is not input, the communication frame generating section may insert the identification information of the gateway to which the local communication apparatus belongs into the communication frame as the repeater station of the communication counterpart.

To achieve the latter object, according to a second aspect of the invention, there is provided a communication control program for allowing a computer for controlling a communication apparatus for use in a communication system capable of communicating among a plurality of communication apparatuses via a plurality of repeater stations to execute:

an information retrieving step of, with input specific information specifying a repeater station being a key, retrieving identification information of the repeater station, and information needed to set a communication path to another repeater station, both stored in a memory in association with the specific information; and a communication frame generating step of generating a communication frame including the retrieved identification information of the repeater station, and the retrieved information needed to set the communication path from the repeater station to which the local communication apparatus belongs to the repeater station to which the communication counterpart belongs.

According to the invention, a user can set a communication path between repeater stations by inputting the names of the repeater stations. This eliminates the need for a troublesome input operation, thus improving the operability of the communication apparatus.

BRIEF DESCRIPTION OF THE DRAWINGS

A more complete understanding of this application can be obtained when the following detailed description is considered in conjunction with the following drawings, in which:

FIG. 4 is a diagram showing an example of a communication path setting list stored in the radio device according to the embodiment;

FIG. 6A is a diagram showing a specific example of setting information to be input to the radio device according to the embodiment from an operation unit by a user;

FIG. 6B is a diagram showing the structure of a header part which is generated in the radio device according to the embodiment when the communication path lies in the local zone;

FIG. 6C is a diagram showing an example of the structure of a header part which is generated in the radio device according to the embodiment when the communication path lies in another zone;

FIG. 7 is a flowchart illustrating an example of a process of setting communication path information in the radio device according to the embodiment;

FIG. 8A is a diagram showing a specific example of communication path setting information to be input to the radio device according to the embodiment from the operation unit by the user to communicate with a specific radio device belonging to another zone;

FIG. 8B is a diagram showing the call sign of a gateway in a zone to which a sender terminal repeater station belongs;

FIG. 8C is a diagram showing an example of the structure of the header part of a communication frame for transmission which is generated in the radio device according to the embodiment;

FIG. 8D is a diagram showing an example of the structure of the communication frame for transmission which is generated in the radio device according to the embodiment in case of communicating with a specified radio device belonging to another zone;

FIG. 10A is a diagram showing a specific example of setting information to be input to the radio device according to the embodiment from the operation unit by the user to communicate with an unspecified radio device belonging to a specific area in another zone;

FIG. 10B is a diagram showing an example of the structure of the header part of a communication frame which is generated in the radio device according to the embodiment;

FIG. 10C is a diagram showing the structure of a communication frame which is generated in the radio device according to the embodiment in case of communicating with an unspecified radio device belonging to a specific area in another zone;

FIG. 13A is a diagram showing a specific example of setting information to be input to the radio device according to the embodiment from the operation unit by the user to communicate with an unspecified radio device belonging to the local area in the local zone;

FIG. 13B is a diagram showing an example of the structure of the header part of a communication frame, which is generated in the radio device according to the embodiment;

FIG. 13C is a diagram showing the structure of a communication frame which is generated in the radio device according to the embodiment in case of communicating with an unspecified radio device belonging to the local area in the local zone;

FIG. 15 is a diagram showing an example of the screen to be displayed on a monitor with the radio device according to the embodiment; and FIG. 16 is a flowchart illustrating an example of a process of setting a call sign in the radio device according to the embodiment in case where an unspecified radio device is a communication counterpart.

DETAILED DESCRIPTION

A communication apparatus according to an embodiment of the present invention will be described below with a radio device being taken as an example.

To begin with a communication system 100 as the infrastructure in which a radio device 15 according to the embodiment is to be used will be described referring to FIG. 1.

Figure 1:
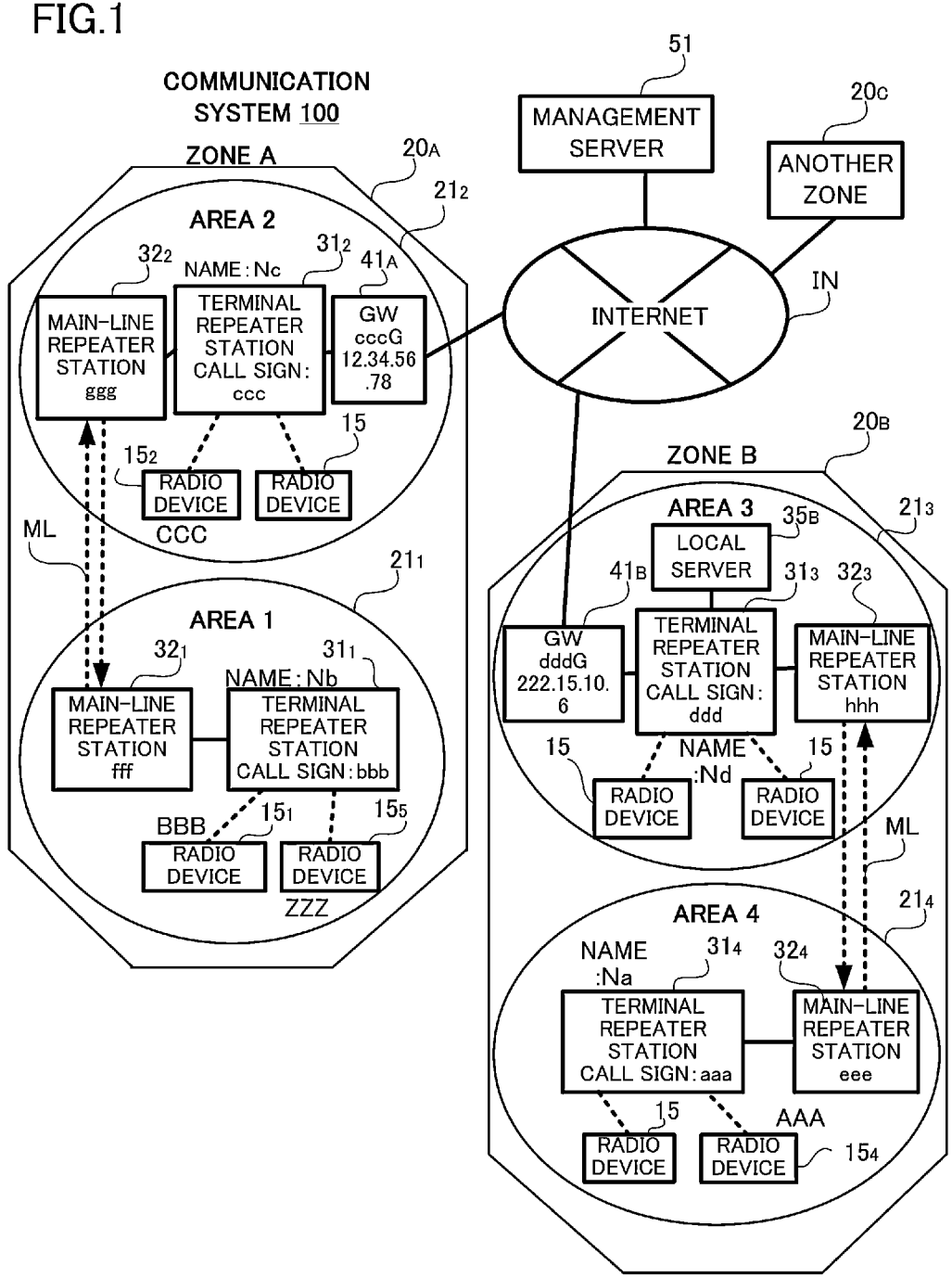
FIG. 1 is a block diagram showing the general configuration of a communication system.

This communication system 100 is configured to have a plurality of zone networks (internal networks) 20 ($20_A$, $20_B$, ...) connected to an Internet IN as shown in FIG. 1.

Each zone network 20 has one or a plurality of area networks 21 ($21_1$, $21_2$, $21_3$, ...).

Each area network 21 includes terminal repeater stations 31 ($31_1$, $31_2$, $31_3$, $31_4$, ...), main-line repeater stations 32 ($32_1$, $32_2$, $32_3$, $32_4$, ...), and a plurality of radio devices 15 configured to be able to radio-communicate with the terminal repeater stations 31.

Call signs as identification information are assigned to each terminal repeater station 31 ($31_1$, $31_2$, $31_3$, $31_4$, ...), each main-line repeater station 32 ($32_1$, $32_2$, $32_3$, $32_4$, ...) and each radio device 15. In addition, names "Nb", "Nc", "Nd" and "Na" are assigned to terminal repeater station $31_1$, $31_2$, $31_3$, $31_4$, respectively.

A call sign is identification information to identify each device in the communication system 100, so that each device is specified by the call sign.

The name that is given to each terminal repeater station is information for specifying the terminal repeater station 31, and is given for a person to easily understand the terminal repeater station. Communication devices do not directly use the names as identification information for setting a communication path. The name set is something which is easily recognizable or identifiable by a person, such as the name of an area where the terminal repeater station 31 is sited (e.g., Hollywood), the name of a manager on the site, or a nickname (Cathy, Lizzy, or the like).

Figure 2:
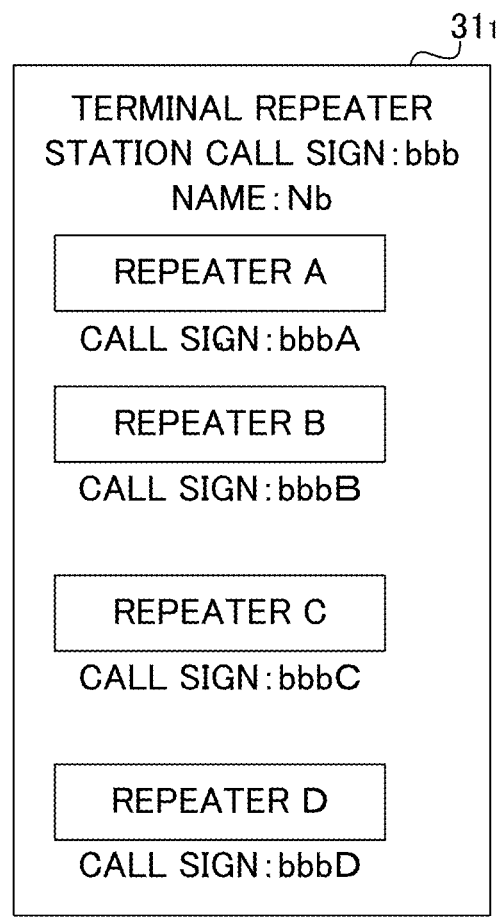
FIG. 2 is a block diagram showing an example of the internal configuration of a terminal repeater station as shown in FIG. 1.

As shown in FIG. 2, a maximum of four repeater stations which communicate in the same frequency band are sited at each terminal repeater station 31. Suffixes A to D are added to the call sign given to the terminal repeater stations 31 to identify each of the repeaters. The frequency at which the radio device 15 transmits by radio a signal to the repeater (uplink) is offset by a given frequency from the frequency at which the repeater transmits a signal to the radio device 15 (down-link).

The terminal repeater station 31 ($31_2$, $31_3$, ...) of any area network 21 ($21_1$, $21_2$, $21_3$, ...) in each zone network 20 ($20_A$, $20_B$, ...) is connected to the Internet IN via a gateway (GW) 41 ($41_A$, $41_B$, ...). A global IP (Internet Protocol) address, together with a call sign, is given to each gateway (GW) 41 ($41_A$, $41_B$, ...).

Main-line repeater stations 32 ($32_1$ and $32_2$, $32_3$ and $32_4$, ...) of individual area networks 21 belonging to the same zone network 20 are connected to each other by a main line ML.

Next, the radio device 15 will be described.

Figure 3:
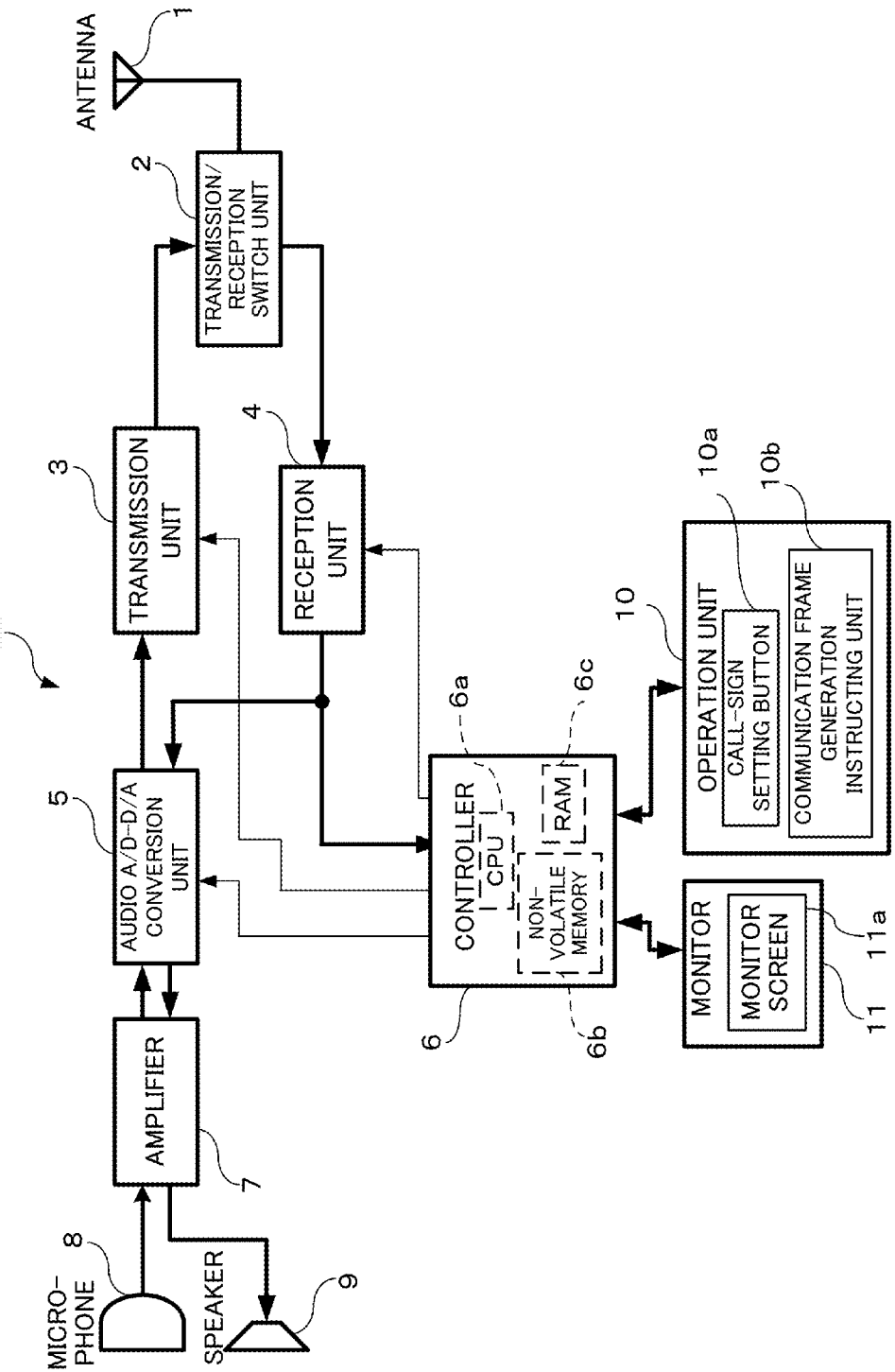
FIG. 3 is a block diagram showing an example of a radio device according to an embodiment of the invention.

As shown in a block diagram of FIG. 3, the radio device 15 has an antenna 1, a transmission/reception switch unit 2, a transmission unit 3, a reception unit 4, an audio A/D-D/A (Analog/Digital-Digital/Analog) conversion unit 5, a controller 6, an amplifier 7, a microphone 8, a speaker 9, an operation unit 10, and a monitor 11.

The antenna 1 transmits and receives radio signals to and from a terminal repeater station 31 (the terminal repeater station which manages an area (local area) to which this radio device belongs).

The transmission/reception switch unit 2 has a function of changing the destination of a signal at the time of transmission and reception. The transmission/reception switch unit 2 outputs a transmission signal input from the transmission unit 3 to the antenna 1, and outputs a reception signal input from the antenna 1 to the reception unit 4.

The transmission unit 3 modulates an input audio signal and data signal based on the GMSK (Gaussian filtered Minimum Shift Keying) modulation system. Further, the transmission unit 3 modulates the frequencies of the modulated audio signal and data signal to transmission frequencies specified by the controller 6, and outputs the transmission frequencies to the transmission/reception switch unit 2. The audio signal is supplied from the audio A/D-D/A conversion unit 5, and the data signal is supplied from the controller 6.

The reception unit 4 has a tuning function of selectively receiving a signal of the frequency specified by the controller 6, and a demodulation function of demodulating the reception signal based on the GMSK modulation system. The reception unit 4 selectively receives and demodulates a signal from a terminal repeater station 31 based on the specified frequency.

The audio A/D-D/A conversion unit 5 has an analog-digital conversion function of performing signal conversion of an audio signal to an analog signal/digital signal.

The controller 6 has a CPU (Central Processing Unit) 6a, a non-volatile memory 6b, and a RAM 6c, and controls the operation of the radio device 15. It is to be noted that the controller 6 includes an information retrieving section, a communication frame generating section, and a gateway determining section, which will be described later. The controller 6 may be a computer.

The non-volatile memory 6b is a flash memory or the like to store a control program. The CPU 6a of the controller 6 controls the radio device 15 in such a way that the radio device 15 functions as a transmitter and a receiver based on the control program using the RAM 6c. The CPU 6a executes the processes in the information retrieving section, the communication frame generating section, and the gateway determining section, which will be described later, by using the memories 6b, 6c.

The non-volatile memory 6b stores a communication path setting list (hereinafter called "list") 71 shown in FIG. 4 as a default at the time of manufacturing the radio device 15. In association with the name of each terminal repeater station 31, this list 71 describes communication path setting information needed to set a communication path from the terminal repeater station 31 to another terminal repeater station 31. A user can adequately change the contents of the list 71 by operating the operation unit 10.

FIG. 4 is a diagram showing an example of the communication path setting list stored in the radio device according to the embodiment. A zone code R0, a name R1 of a terminal repeater station 31, a call sign (identification information) R2 of the terminal repeater station 31, A call sign R3 of a gateway 41 located in a corresponding zone, a down-link frequency R4 of the terminal repeater station 31, and an offset R5 of the terminal repeater station 31 are registered in the list 71 shown in FIG. 4 in association with one another.

The zone code R0 is a code given to a zone used in the communication system 100 in FIG. 1. The terminal repeater stations 31 that have the same zone code R0 belong to the same gateway 41.

The name R1 of a terminal repeater station 31 is information for specifying the terminal repeater station 31. As mentioned above, the name R1 is given to a terminal repeater station 31 so that a person can easily recognize and identify the terminal repeater station 31, and is not directly used by communication apparatuses as identification information for setting a communication path.

The call sign R2 of a terminal repeater station 31 is identification information assigned to the terminal repeater station 31, which is specified in the communication system 100 by this call sign.

The call sign R3 of a gateway 41 is the call sign of the gateway that is set in the zone to which the terminal repeater station 31 belongs.

The down-link frequency R4 indicates the frequency of a transmission signal to the radio device 15 from the associated terminal repeater station 31.

The offset R5 indicates the amount of a shift of the up-link frequency or the frequency of the transmission signal from the radio device 15 to the terminal repeater station 31 from the down-link frequency. In case of a down-link frequency FD and an offset FO, for example, an up-link frequency FU is FD+FO.

Suppose, for example, that the terminal repeater station $31_1$ is located in an area 1 of the communication system 100 shown in FIG. 1, a name "Nb" and a call sign "bbb" are given to this terminal repeater station $31_1$, the down-link frequency FD of the terminal repeater station $31_1$ is 439.4 MHz, and the up-link frequency FU thereof is 434.4 (=439.4-5) MHz. In this case, as shown in a line L1 of the list 71 in FIG. 4, "A" as the zone code R0, "Nb" as the name R1 of the terminal repeater station, "bbb" as the call sign R2 of the terminal repeater station, a call sign "cccG" of a gateway $41_A$ located in the zone A, the down-link frequency of "439.4" MHz, and the offset of "−5" are stored in the form of the list 71.

It is to be noted that as shown in a group name R00 of the list 71 in FIG. 4, desired repeater stations, e.g., Nb, Nc and Nd, may be grouped together with a group name "group 1". At this time, a single repeater station may be set as a single group as in a "group 2". In this manner, the user can freely group repeater stations as a result of permitting a repeater station to be designated without being conscious of the zone.

Returning to FIG. 3, the controller 6 generates data of a communication frame F shown in FIG. 5, such as a bit sync signal, a frame sync signal, P_FCS and a data frame, which will be described later, and supplies the data to the transmission unit 3. Those pieces of data may be generated by the transmission unit 3.

The amplifier 7 amplifies an audio signal supplied from the microphone 8, and supplies the amplified audio signal to the audio A/D-D/A conversion unit 5. The amplifier 7 amplifies an audio signal supplied from the audio A/D-D/A conversion unit 5, and supplies the amplified audio signal to the speaker 9.

The microphone 8 acquires the user's speech sound, and supplies it as an audio signal to the amplifier 7.

Based on the audio signal supplied from the amplifier 7, the speaker 9 outputs the speech sound of the user of another radio device 15 which is a communication counterpart.

The operation unit 10 is a device for inputting an instruction and information to the radio device 15. Various operation keys are provided at the operation unit 10. The user can make various inputs by operating the operation keys, and can allow the radio device 15 to perform operations based on the inputs.

The operation unit 10 has an input unit 10a for inputting the call signs of the local radio device and the counterpart radio device and the name of the repeater station in response to the operation, and a communication frame generation instructing unit 10b which acquires input information input from the input unit 10a and outputs an instruction to generate the communication frame F to the controller 6.

It is to be noted that the communication frame generation instructing unit 10b may be provided not in the operation unit 10 but in the controller 6.

The contents of the operation on the operation unit 10 are detected by the controller 6. That is, the controller 6 detects the type of the operation key operated by the user, and the contents of the operation specified by the operation key. Then, the controller 6 discriminates the contents input by the operation key, and controls the radio device 15 to perform an operation according to the input contents.

The monitor 11 is constituted by a display unit having a monitor screen 11a comprised of a liquid crystal display or the like. A notification of the operational status of the radio device 15 to the user, a message to prompt the user to make an input using the operation unit 10 and other information are displayed on the monitor screen 11a.

Next, a description will be given of the operation when the radio device 15 with the foregoing configuration calls a designated counterpart radio device, i.e., a specified radio device.

Figure 5:
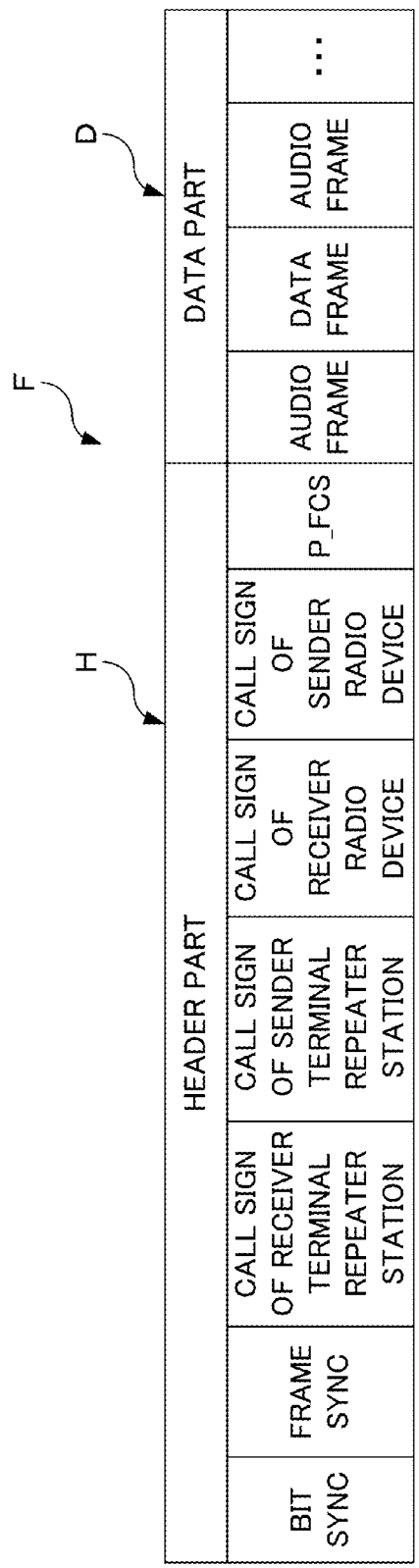
FIG. 5 is a diagram showing a communication frame of a signal to be transmitted to the radio device according to the embodiment.

As shown in FIG. 5, the radio device 15 generates a communication frame F having a header part H including the call sign of the terminal repeater station of the transmission destination, the call sign of the terminal repeater station of the sender, the call sign of the receiver radio device and the call sign of the sender radio device, and a data part D, and sends the communication frame F to the terminal repeater station 31.

To generate the header part H of the communication frame F, the user operates the operation unit 10 to input the name of the terminal repeater station 31 of the transmission destination, the name of the terminal repeater station 31 of the sender, the call sign of the receiver radio device 15, and the call sign of the sender radio device 15, and then instructs the controller 6 to send the input information and generate the communication frame F. The instruction to generate the communication frame F may be executed by the controller 6.

Upon reception of the input and the instruction, the controller 6 generates the header part H through procedures illustrated in FIG. 7 via the incorporated communication frame generating section.

First, the controller 6 sets the input call sign of the sender radio device 15 and the input call sign of the receiver radio device 15 in the header part H via the communication frame generating section (step S11).

Next, with the name of the sender terminal repeater station 31 being a key, the controller 6 searches the list 71 shown in FIG. 4 via the information retrieving section to acquire the call sign of the corresponding terminal repeater station 31. Upon reception of the acquired result, the controller 6 sets the call sign of the sender terminal repeater station 31 in the header part H via the communication frame generating section as shown in FIG. 6B or FIG. 6C (step S12).

Further, the controller 6, via the information retrieving section, acquires the call sign of the gateway 41 which is registered in the same line in the list 71, i.e., the call sign of the gateway 41 to which the sender terminal repeater station 31 belongs (step S13).

Subsequently, with the input name of the receiver terminal repeater station 31 being a key, the controller 6 searches the list 71 via the information retrieving section to acquire the call sign of the gateway corresponding to the searched receiver terminal repeater station 31 (step S14).

Next, upon reception of the acquired result on the gateway, the controller 6, via the gateway determining section, determines whether the call sign of the gateway 41 that is located in the zone to which the receiver terminal repeater station 31 belongs and is acquired in step S14 matches with the call sign of the gateway 41 that is located in the zone to which the sender terminal repeater station 31 belongs and is acquired in step S13 (step S15). The result is used in determining whether the communication path lies inside the zone or extends outside the zone.

When the call signs of both gateways 41 match with each other (step S15; YES), the communication path lies in the same zone. At this time, the controller 6, via the communication frame generating section sets the call sign of the receiver terminal repeater station 31 in the header part H as the call sign of the receiver repeater station as shown in FIG. 6B (step S16).

When the call signs of both gateways 41 do not match with each other (step S15; NO), on the other hand, the communication path extends over another zone. At this time, the controller 6, via the communication frame generating section, sets the call sign of the gateway 41 of the local zone, discriminated in step S13, in the header part H as the call sign of the receiver repeater station as shown in FIG. 6C (step S17).

Finally, the controller 6, via the communication frame generating section, adds sync information etc. to the header part H to complete the header part H (step S18).

Then, the controller 6 acquires a down-link frequency and offset value stored in the list 71 in association with the sender repeater station, and computes an up-link frequency from the down-link frequency and offset value. The controller 6 sends the down-link frequency to the reception unit 4 to be set as the reception frequency, and sends the up-link frequency to the transmission unit 3 to be set as the transmission frequency (step S19).

The controller 6, via the communication frame generating section, adds the data part D to the generated header part H to generate the communication frame F for transmission, and instructs the transmission unit 3 to send the communication frame F to the terminal repeater station 31.

In case of communication with an unspecified radio device in a desired area, the user inputs the call sign of the sender radio station, and selects repeater stations in desired areas as the sender repeater station to which the sender radio device 15 belongs, and the receiver repeater station. Those pieces of input information are sent to the controller 6 as has already been explained above.

In response to the input operation, the controller 6 sets the call sign of the counterpart radio device to generate the header part H as follows according to process procedures illustrated in FIG. 16. The other setting information of the header part H is the same as that in the case of communication with a specified radio device.

First, the information retrieving section of the controller 6 searches the list 71 based on the name of the selected sender repeater station and the name of the selected receiver repeater station to acquire the call signs of the repeater stations. Based on the call signs of the repeater stations, the controller 6 determines whether or not the area to which the unspecified radio device to be called belongs is the same area as that of the sender radio station (step S21).

When the areas are the same (step S21; YES), the controller 6 causes the communication frame generating section to set a call code "CQCQCQ" of the unspecified communication apparatus as the call sign of the counterpart radio device in the header part H (step S23).

When the area to which the unspecified radio device to be called belongs is outside the area of the sender radio station (step S21; NO), on the other hand, the controller 6 determines whether or not the area to which the unspecified radio device to be called belongs lies in the same zone as that of the sender radio station (step S22).

When the area lies in the same zone (step S22; YES), the controller 6, via the communication frame generating section, sets the call code "CQCQCQ" of the unspecified communication apparatus as the call sign of the counterpart radio device in the header part H (step S24).

When the area does not lie in the same zone (step S22; NO), the controller 6, via the communication frame generating section, sets the call sign of the repeater station of the counterpart radio device added with "/." as the call sign of the counterpart radio device in the header part H (step S25).

Specific examples of the general communication operation of the communication system 100 will be described below.

Case 1) Case where the radio device $15_1$ in an area 1 communicates with a radio device $15_4$ in an area 4 in another zone:

Using the operation unit 10, the user inputs the name "Na" of a receiver terminal repeater station $31_4$, the name "Nb" of a sender terminal repeater station $31_1$, the call sign "AAA" of the receiver radio device $15_4$, and the call sign "BBB" of the sender radio device $15_1$, as shown in FIG. 8A, and instructs the transmission thereof.

As has already been explained, the input information is sent to the controller 6 which generates the header part H according to the flowchart of FIG. 7. The controller 6, via the communication frame generating section, sets "BBB" first as the call sign of the sender radio device and "AAA" as the call sign of the receiver radio device $15_4$ in the header part H from the input information as shown in FIG. 8C (step S11).

Next, the information retrieving section of the controller 6 searches the list 71 shown in FIG. 4 with the input name "Nb" of the sender terminal repeater station $31_1$ being a key. As a result, a line L1 having the name "Nb" is hit. The controller 6, via the information retrieving section, acquires the call sign "bbb" of the terminal repeater station stored in information R2 in the line L1, and via the communication frame generating section, sets the call sign "bbb" as the call sign of the sender repeater station in the header part H as shown in FIG. 8C (step S12). Further, the controller 6, via the information retrieving section, acquires a gateway call sign "cccG" stored in information R3 in the line L1 as shown in FIG. 8B (step S13).

Subsequently, the information retrieving section of the controller 6 searches the list 71 shown in FIG. 4 with the input name of the receiver terminal repeater station being a key. As a result, a line L4 having the name "Na" is hit. Further, the controller 6, via the information retrieving section, acquires a gateway call sign "dddG" stored in information R3 in the line L4 (step S14).

Next, the controller 6, via the gateway determining section, determines whether or not the call sign "dddG" of the gateway $41_B$ in the zone B to which the receiver terminal repeater station $31_4$ acquired in step S14 belongs matches with the call sign "cccG" of the gateway $41_A$ in the zone A to which the sender terminal repeater station $31_1$ acquired in step S13 belongs (step S15).

In this example, the controller 6 determines that both gateway call signs do not match with each other (step S15; NO), the controller 6, via the communication frame generating section, sets the call sign "cccG" of the gateway $41_A$ in the zone A acquired in step S13 as the call sign of the receiver repeater station in the header part H (step S17).

Subsequently, the controller 6, via the communication frame generating section, adds a sync signal etc. (not shown in FIGS. 8A to 8D) to complete the header part H (step S18).

In addition, the controller 6 acquires the value "439.4" of the down-link frequency and the offset value "−5" set in the line L1 at the time of searching the list 71 via the information retrieving section. The controller 6, via the information retrieving section, computes the up-link frequency 434.4 (=439.4-5) from the acquired down-link frequency value "439.4" and offset value "−5", and sends the down-link frequency "439.4" MHz to the reception unit 4, and the up-link frequency "434.4" MHz to the transmission unit 3, and sets the down-link frequency as the reception frequency in the reception unit 4, and the up-link frequency as the transmission frequency in the transmission unit 3 (step S19).

The controller 6, via the communication frame generating section, combines the generated header part H with the data part D, generated from the transmission data supplied from the audio A/D-D/A conversion unit 5, to generate the communication frame F as shown in FIG. 8D, and send the communication frame F.

The terminal repeater station $31_1$ receives the communication frame F, and sends it onto the main line ML via the main-line repeater station $32_1$ based on the call sign "cccG" of the receiver repeater station, included in the header part H.

The communication frame F is transferred via the main line ML to the gateway $41_A$ based on the call sign "cccG" of the receiver repeater station.

The gateway $41_A$ inquires a management server 51 about information on the receiver radio device $15_4$. Based on the result of the reply from the management server 51, the gateway $41_A$ changes the call sign "cccG" of the receiver repeater station in the communication frame F to the call sign "aaa" of the terminal repeater station $31_4$ in the area 4 which is the final transmission destination, and rewrites the call sign "bbb" of the sender repeater station to the call sign "dddG" of the gateway $41_B$ in the zone B of the transmission destination as shown in FIG. 9A.

Figure 9A:
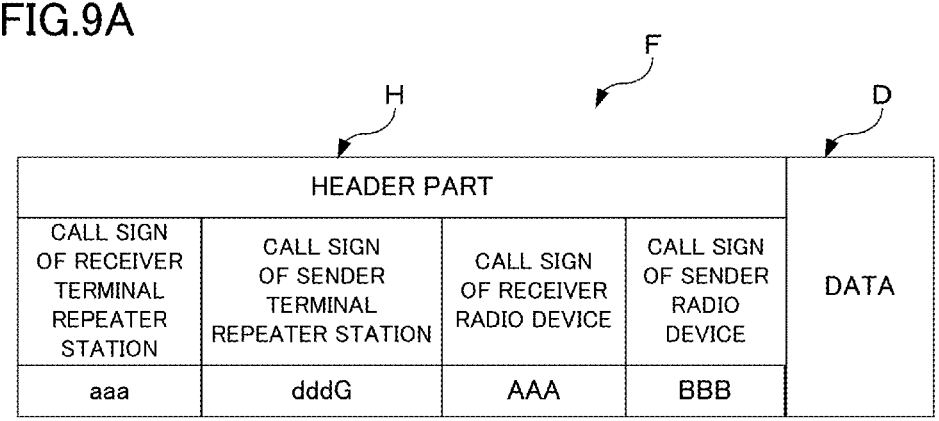
FIG. 9A is a diagram showing an example of the structure of a communication frame for transmission which is corrected by the gateway.
Figure 9B:
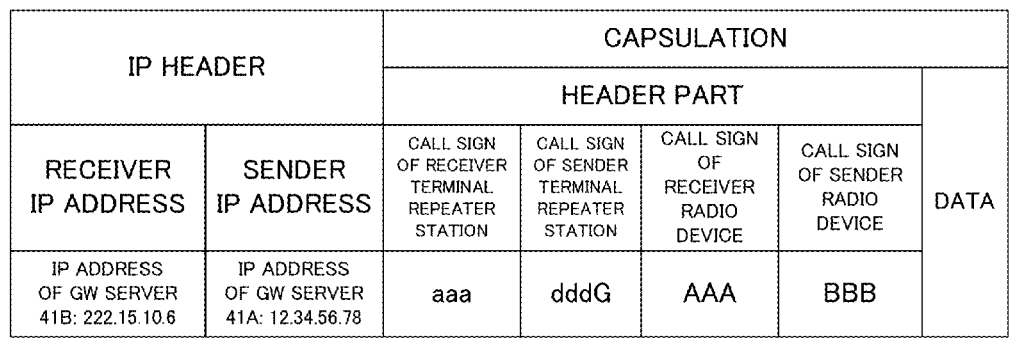
FIG. 9B is a diagram showing an example of the structure of a communication packet to be transmitted over the Internet.

Further, the gateway $41_A$ packetizes the corrected transmission frame, and adds an IP header including a global IP address (222.15.10.6) of the gateway $41_B$ as the receiver IP address and a global IP address (12.34.56.78) of the gateway $41_A$ as the sender IP address to generate an IP packet shown in FIG. 9B, and outputs the IP packet to the Internet IN.

This IP packet is transferred over the Internet IN to be received by the gateway $41_B$ in the zone B.

The gateway $41_B$ removes the IP header to reproduce the communication frame F shown in FIG. 9A, and outputs the communication frame F to the main line ML in the zone B via the terminal repeater station $31_3$. This communication frame F is transferred over the main line ML to the terminal repeater station $31_4$ to be radio-transmitted therefrom.

The radio device $15_4$ discriminates that the received communication frame F is addressed to the radio device $15_4$ from the call sign of the receiver radio device in the header part H in the communication frame F, and reproduces the data part D.

Meanwhile, the communication frame F from the radio device $15_4$ is sent to the terminal repeater station $31_1$ in the area 1 in similar procedures. The terminal repeater station $31_1$ transmits the received communication frame F at the set down-link frequency of 439.4 MHz.

The reception unit 4 of the radio device $15_1$ receives the signal via the antenna 1, demodulates the received signal, and outputs the demodulated signal from the speaker 9 via the audio A/D-D/A conversion unit 5 and the amplifier 7.

Case 2) Case where the radio device $15_1$ in the area 1 makes an unspecified call to the radio device 15 in the area 4 in the communication system 100 in FIG. 1

In this case, as shown in FIG. 10A, using the operation unit 10, the user inputs the name "Na" of the receiver repeater station in the area 4 which is the receiver terminal repeater station, the name "Nb" of the sender terminal repeater station, the call sign "BBB" of the sender radio device, and the name "Na" of the area 4 as the receiver radio device. When transmission is instructed through the operation unit 10, the input information is sent to the controller 6. The controller 6, via the communication frame generating section, adds "I" to the head of the call sign "aaa" of the receiver terminal repeater station $31_4$ in the area 4 to set "/aaa" as the call sign of the receiver radio device, and sets cccG as the call sign of the receiver repeater station to generate the header part H shown in FIG. 10B in procedures similar to those in the case 1.

The user may change the procedures of searching the list 71, which are executed by the information retrieving section in the controller 6, in such a way as to use the name "Na" set as the call sign of the receiver radio device in FIG. 10A as the key for searching the list 71 instead of the name "Na" of the receiver terminal repeater station. This change can allow the user to skip inputting the name "Na" of the receiver terminal repeater station in FIG. 10A.

Subsequently, the controller 6, via the communication frame generating section, combines the generated header part H with the transmission data supplied from the audio A/D-D/A conversion unit 5 to generate the communication frame F as shown in FIG. 10C, and transmits the communication frame F.

This communication frame F reaches the terminal repeater station $31_4$ through a process similar to that in the case 1. In this process, the gateway $41_A$ changes the call sign "cccG" of the receiver repeater station in the communication frame F to the call sign "aaa" of the terminal repeater station $31_4$ in the area 4 which is the final transmission destination, and rewrites the call sign "bbb" of the sender repeater station to the call sign "dddG" of the gateway $41_B$ in the zone B of the transmission destination as shown in FIG. 9A. The terminal repeater station $31_4$ replaces the call sign "/aaa" of the receiver terminal repeater station with "CQCQCQ", and radio-transmits the communication frame F.

The radio device 15 in the area 4 discriminates that the call sign of the receiver radio device in the header part H in the received communication frame F specifies a call to an unspecified radio device, and demodulates the received communication frame to reproduce the data part D.

Case 3) Case where the radio device $15_1$ in the area 1 communicates with the radio device $15_2$ in the area 2 belonging to the same zone A in the communication system 100 in FIG. 1

Figures 11A, 11B, 11C:
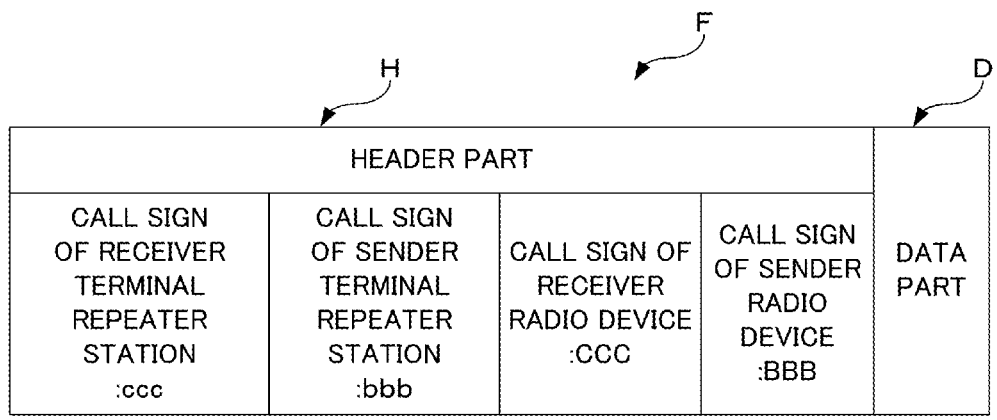
FIG. 11A is a diagram showing a specific example of setting information to be input to the radio device according to the embodiment from the operation unit by the user to communicate with a specified radio device belonging to the local zone.
FIG. 11B is a diagram showing an example of the structure of the header part of a communication frame which is generated in the radio device according to the embodiment.
FIG. 11C is a diagram showing the structure of the communication frame which is generated in the radio device according to the embodiment in case of communicating with a specified radio device belonging to the local zone.

In this case, as shown in FIG. 11A, using the operation unit 10, the user inputs the name "Nc" of the receiver terminal repeater station, the name "Nb" of the sender terminal repeater station, the call sign "CCC" of the receiver radio device, and the call sign "BBB" of the sender radio device, and instructs the transmission thereof.

Upon reception of the input information, the controller 6 generates a communication frame F in the following procedures.

First, the controller 6, via the communication frame generating section, sets the call sign "BBB" of the sender radio device and the call sign "CCC" of the receiver radio device in the header part H as shown in FIG. 11B (step S11).

Next, the controller 6, via the information retrieving section, searches the list 71 with the input name "Nb" of the sender terminal repeater station being a key. As a result, the line L1 is hit. The controller 6, via the information retrieving section, acquires the call sign "bbb" of the sender terminal repeater station $31_1$ stored in the information R2 in the line L1, and, via the communication frame generating section, sets the call sign "bbb" in the header part H as shown in FIG. 11B (step S12). Further, the controller 6, via the information retrieving section, acquires the call sign "cccG" of the gateway stored in the information R3 in the line L1 (step S13).

Subsequently, the controller 6, via the information retrieving section, searches the list 71 with the input name "Nc" of the receiver terminal repeater station $31_2$ being a key. As a result, the line L2 is hit. The controller 6, via the information retrieving section, acquires the gateway call sign "cccG" stored in the information R3 in the line L2 (step S14), and, via the gateway determining section, determines whether both call signs match with each other (step S15).

In this example, as the call signs acquired in steps S13 and S14 are both "cccG" and match with each other (step S15; YES), the controller 6, via the communication frame generating section, sets the call sign stored in the information R2 in the line L2 in the list 71, i.e., the call sign "ccc" of the terminal repeater station $31_2$ as the call sign of the receiver repeater station in the header part H (step S17).

In addition, the controller 6 sets the down-link frequency "439.4" MHz set in the line L1 in the list 71 as the reception frequency in the reception unit 4, and sets the up-link frequency "434.4" MHz as the transmission frequency in the transmission unit 3 (step S19).

The controller 6, via the communication frame generating section, combines the generated header part H with the data part D, formed with the data supplied from the audio A/D-D/A conversion unit 5, to generate the communication frame F as shown in FIG. 11C, and sends the generated communication frame F.

The terminal repeater station $31_1$ receives the communication frame F, and sends it onto the main line ML via the main-line repeater station $32_1$ based on the call sign "ccc" of the receiver repeater station, included in the header part H.

The communication frame F is transferred via the main line ML to the terminal repeater station $31_2$ based on the call sign of the receiver repeater station.

The terminal repeater station $31_2$ radio-transmits the communication frame F.

The radio device $15_2$ discriminates that the received communication frame F is addressed to the radio device $15_2$ from the call sign of the receiver radio device in the header part H in the communication frame F, and reproduces the data part D to reproduce an audio signal.

Case 4) Case where the radio device $15_1$ in the area 1 makes an unspecified call to the radio device 15 in another area 2 in the same zone in the communication system 100

Figure 12A:
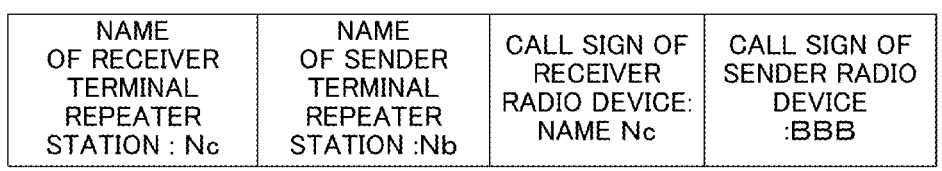
FIG. 12A is a diagram showing a specific example of setting information to be input to the radio device according to the embodiment from the operation unit by the user to communicate with an unspecified radio device belonging to a specific area in the local zone.

In this case, as shown in FIG. 12A, using the operation unit 10, the user inputs the name "Nc" of the receiver terminal repeater station $31_2$, the name "Nb" of the sender terminal repeater station $31_1$, the call sign "BBB" of the sender radio device, and the name "Nc" of the receiver terminal repeater station $31_2$, which is a repeater station in the area 2, as the call sign of the receiver radio device.

Figure 12B:
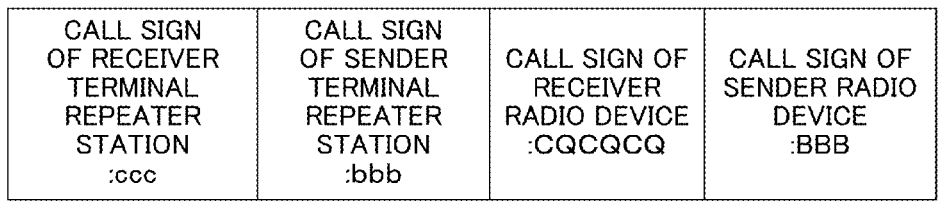
FIG. 12B is a diagram showing an example of the structure of the header part which is generated in the radio device according to the embodiment.

When the user instructs transmission of the input information through the operation unit 10, the header part shown in FIG. 12B is formed in procedures similar to those in each of the foregoing cases. In this case, the controller 6 automatically sets the code "CQCQCQ" to call an unspecified communication apparatus as the call sign of the receiver radio device.

The user may change the search procedures in such a way as that as a result of the search in the list 71 performed by the information retrieving section with the name "Nc" set as the call sign of the receiver radio device in FIG. 12A being used as a key, the call sign "ccc" of the receiver terminal repeater station shown in FIG. 12B is automatically set by the communication frame generating section in the controller 6. This change can allow the user to skip inputting the name "Nc" of the receiver terminal repeater station $31_2$ in FIG. 12A.

In addition, the controller 6, via the information retrieving section, acquires the down-link frequency set in the line L1 in the list 71, and sets it in the reception unit 4, and sets the up-link frequency, computed by the scheme already described above, in the transmission unit 3.

Figure 12C:
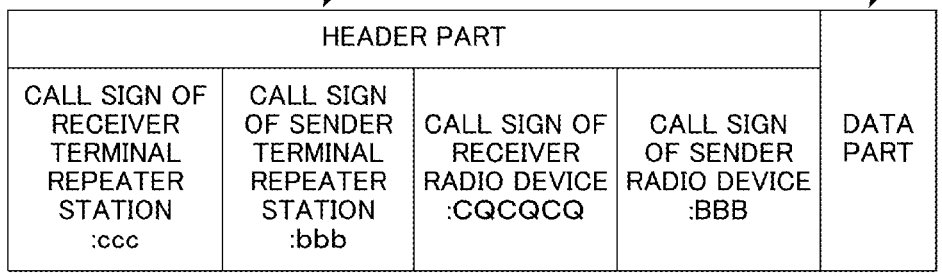
FIG. 12C is a diagram showing the structure of a communication frame which is generated in the radio device according to the embodiment in case of communicating with an unspecified radio device belonging to a specific area in the local zone.

Subsequently, the controller 6, via the communication frame generating section, combines the generated header part H with the data part D formed with the transmission data supplied from the audio A/D-D/A conversion unit 5 to generate the communication frame F as shown in FIG. 12C, and sends the generated communication frame F sequentially.

This communication frame F reaches the terminal repeater station $31_2$ through the terminal repeater station $31_1$, the main-line repeater station $32_1$, the main line ML and the main-line repeater station $32_2$.

The terminal repeater station $31_2$ radio-transmits the received communication frame F.

The radio device 15 in the area 2 discriminates from the call sign of the receiver radio device in the header part H in the received communication frame F that it is a call to an unspecified communication apparatus, and reproduces the data part D to reproduce an audio signal.

Case 5) Case Where the radio device $15_1$ in the area 1 makes an unspecified call to the radio device 15 in the same area 1 in the communication system 100

In this case, as shown in FIG. 13A, using the operation unit 10, the user inputs the name "Nb" of the receiver terminal repeater station 31₁, the name "Nb" of the sender terminal repeater station 31₁, the call sign "BBB" of the sender radio device, and the code "CQCQCQ" to call an unspecified communication apparatus as the call sign of the receiver radio device. It is to be noted that the name "Nb" of the receiver terminal repeater station 31₁ may be set as the call sign of the receiver radio device.

When transmission of the input information is instructed through the operation unit 10, the header part shown in FIG. 13B is formed in procedures similar to those in the case 4.

The user may change the procedures of searching the list 71, which are executed by the information retrieving section in the controller 6, in such a way as to use the name "Nb" set as the name of the sender terminal repeater station in FIG. 13A as the key for searching the list 71 instead of the name "Nb" of the receiver terminal repeater station. This change can allow the user to skip inputting the name "Na" of the receiver terminal repeater station 31₂ in FIG. 13A.

In addition, the controller 6, via the information retrieving section, acquires the down-link frequency set in the line L1 in the list 71, and sets it in the reception unit 4, and sets the up-link frequency, computed by the scheme already described above, in the transmission unit 3.

Then, the controller 6, via the communication frame generating section, combines the generated header part H with the data part D formed with the transmission data supplied from the audio A/D-D/A conversion unit 5 to generate the communication frame F as shown in FIG. 13C, and sends the communication frame F sequentially.

This communication frame F is received by the terminal repeater station 31₁.

The terminal repeater station 31₁ radio-transmits the received communication frame F.

The radio device 15 in the area 1 discriminates from the call sign of the receiver radio device in the header part H in the received communication frame F that it is a call to an unspecified radio device, and reproduces the data part D to reproduce an audio signal.

Figure 14:
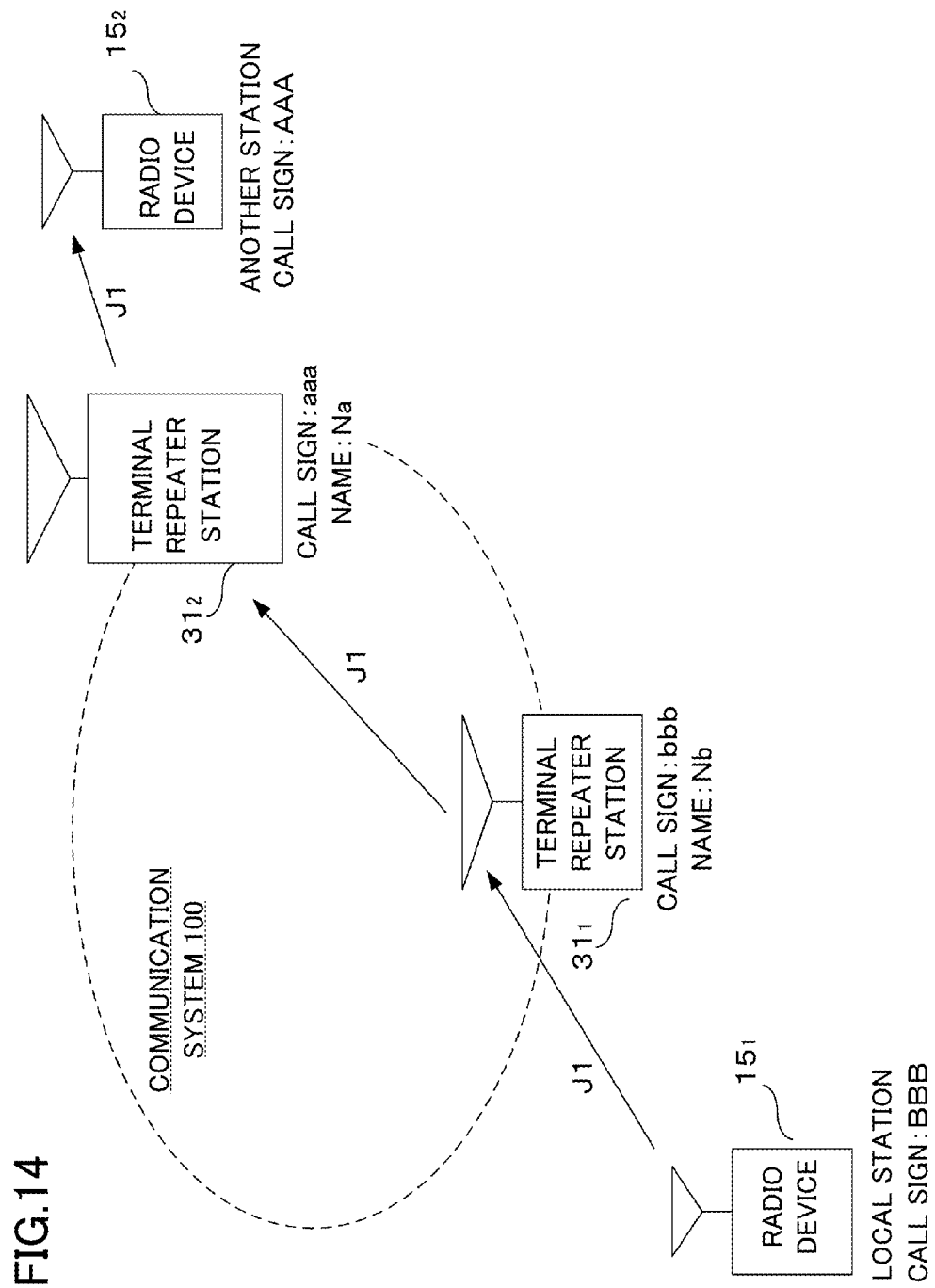
FIG. 14 is a diagram representing showing the imaged structure of a communication system which is assumed in case of carrying out communication using the radio device according to the embodiment.

According to the radio device 15 of the embodiment, as described above, in sending information J1 from the local radio device 15₁ to another radio device 15₂ in the communication system 100, as shown in FIG. 14, the user can set a communication path with being conscious only of the call sign of the local radio device 15, the name of the terminal repeater station 31 in the area to which the local radio device 15 belongs, the name of the terminal repeater station 31 in the area to which the radio device 15 of the communication destination belongs, and the call sign of the radio device 15 of the communication destination.

In case of calling an unspecified communication apparatus in an area desired by the user, the user has only to select the name of the repeater station located in that area using the communication apparatus, and need not grasp the communication path. With regard to a mobile communication apparatus, particularly, even when the sender repeater station is changed, the user need not grasp the communication path between the changed repeater station and a repeater station to which an unspecified communication apparatus to be called belongs.

The input information that is used in determining whether or not it is necessary to go through a gateway at the time of setting a communication path should not necessarily be the call sign of the gateway. The input information may be other information as long as it specifies the gateway to which each repeater station belongs. For example, the information may be the zone code of the zone to which the repeater station belongs. The controller 6 can determine whether or not it is necessary to go through a gateway with the zone code "A", "B" shown in R0 in FIG. 4.

The information input to specify a repeater station should not necessarily be the name of a terminal repeater station, and may be other information. For example, the information may be the call sign of the terminal repeater station. Further, the input may be made by any method, such as selecting what is displayed, or manual input made by a key input. This is true of the method of inputting other input information.

Further, to facilitate determination on whether or not it is necessary to go through a gateway at the time of setting a communication path, the radio device 15 can take the following approach. The radio device 15 prestores a list describing whether or not it is necessary to go through a gateway in the non-volatile memory 6b for each of all the combinations of the sender repeater station and receiver repeater stations. The controller 6 searches the list to determine whether or not it is necessary to go through a gateway from the input combinations of the sender repeater station and receiver repeater stations.

To make the setting of a call sign easier, the controller 6 can form a database storing the call signs of extracted receiver radio devices, and the call signs of the repeater stations to which the radio devices belong (pairs of call signs) into the RAM 6c or the non-volatile memory 6b. The controller 6 may display the database on the monitor screen 11a as shown in FIG. 15, and may set the selected call sign at the part that corresponds to the header part H of the communication frame F in response to the selection operation performed on the display screen using the call-sign setting button 10a in the operation unit 10.

Further, when only the call sign of the receiver radio device is input and the name of the receiver repeater station is not input in the case of calling a specified radio device, the user may set the call sign of a gateway to which the local radio device belongs as the call sign of the receiver repeater station. With the setting done, the call sign of the receiver repeater station is checked by the management server connected to the Internet with the call sign of the receiver radio device being a key, including the case where the receiver lies in the local zone or in the local area. Furthermore, when the call sign of the receiver radio device is input, the controller 6 can set the call sign of a gateway to which the local radio device belongs as the call sign of the receiver repeater station, regardless of the presence/absence of the name of the receiver repeater station.

The embodiment is characterized in that a communication frame (especially, header part H) is generated through a simple operation. The configuration of the operation instructing means is optional, and an instruction may be given by hardware or by software. Specifically, an instruction may be given by using a button, an icon, a mouse, a pad, a switch, a key, a simple one-touch operation, or a one-action operation.

In addition, the controller 6, the transmission unit 3, the reception unit 4, etc. shown in FIG. 3 may be configured by using a DSP (Digital Signal Processor).

The foregoing description of the invention has been given of the example where the GMSK modulation system is adopted as the system of modulating signals transmitted and received by a radio device. The invention may be worked out using another modulation system, such as the QPSK modulation system, instead of the GMSK modulation system.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for use in a communication system capable of communicating among a plurality of communication apparatuses via a plurality of repeater stations, comprising:

an input unit configurable to input a name of a first repeater station to which a source communication apparatus belongs, and a name of a second repeater station to which a destination communication apparatus belongs, wherein the name of the first repeater is associated with identification information of the first repeater and the name of the second repeater is associated with identification information of the second repeater;

a memory configurable to store information as communication path setting information, wherein the name of each repeater station, identification information of each repeater station and identification information of a gateway to which each repeater station belongs for each of a plurality of repeater stations are included and associated with each other;

an information retrieving section configurable to retrieve names of the repeater stations matching with the names of the first and the second repeater stations inputted from the input unit, and then identification information of the repeater stations and identification information of the gateways based on the retrieved names of the repeater stations in the communication path setting information, and acquire the retrieved identification information as identification information of the first repeater station, identification information of the second repeater station, identification information of the gateway to which the first repeater station belongs and identification information of the gateway to which the second repeater station belongs;

a gateway determining section configurable to determine whether the retrieved identification information of the gateway to which the first repeater station belongs matches with the retrieved identification information of the gateway to which the second repeater station belongs; and a communication frame generating section configurable to generates a communication frame which includes information regarded as identification information of the source repeater station and information regarded as identification information of the destination repeater station, wherein the communication frame generating section is further configurable to generate the communication frame by setting the retrieved identification information of the first repeater station as information regarded as identification information of the source repeater station included in the communication frame, setting the retrieved identification information of the second repeater station as information regarded as identification information of the destination repeater station included in the communication frame when the gateway determining section determines that the retrieved identification information of the gateway to which the first repeater station belongs matches with the retrieved identification information of the gateway to which the second repeater station belongs, and setting the retrieved identification information of the gateway to which the first repeater station belongs as information regarded as identification information of the destination repeater station included in the communication frame when the gateway determining section determines that there is no match, wherein the name of the second repeater station inputted from the input unit is inputted as information specifying at least identification information of the destination communication apparatus;

the communication frame includes information regarded as identification information of the destination communication apparatus; and the communication frame generating section is further configurable to set identification information of an unspecified radio device, which is the identification information indicating that the destination communication apparatus is the unspecified radio device, as information regarded as identification information of the destination communication apparatus included in the communication frame when the gateway determining section determines that the identification information of the gateway to which the first repeater station belongs matches with the identification information of the gateway to which the second repeater station belongs, and the communication frame generating section is further configurable to set information including the retrieved identification information of the second repeater station as information regarded as identification information of the destination communication apparatus included in the communication frame when the gateway determining section determines that there is no match.

2. The communication apparatus according to claim 1, wherein the communication path setting information further includes transmission frequency information associated with the name of each repeater station, wherein the transmission frequency is a frequency of a signal to be used in transmitting information to each repeater station, and the information retrieving section is further configurable to retrieve the transmission frequency information used in transmitting information to the first repeater station from the communication path setting information, and to set a transmission frequency of the source communication apparatus based on a retrieval result when the name of the first repeater station is inputted.

3. The communication apparatus according to claim 1, wherein the communication frame generating section is further configurable to set the retrieved identification information of the gateway to which the first repeater station belongs in the communication frame as information regarded as identification information of the source repeater station of the communication frame when no name of the destination repeater station is inputted.

4. The communication apparatus according to claim 1, wherein the input unit is further configurable to input the identification information of the destination communication apparatus;

the communication frame includes information regarded as identification information of the destination communication apparatus; and the communication frame generating section is further adapted to set the inputted identification information of the destination communication apparatus as information regarded as identification information of the destination communication apparatus included in the communication frame.

5. A communication control method for controlling a communication apparatus for use in a communication system capable of communicating among a plurality of communication apparatuses via a plurality of repeater stations, characterized in that the communication apparatus comprises a memory configurable to store information, as communication path setting information, wherein the name of the repeater station, identification information of the repeater station and identification information of a gateway to which the repeater station belongs for each of a plurality of repeater stations are included and associated with each other, and the communication control method comprises:

- an information inputting step of inputting a name of a first repeater station to which a source communication apparatus belongs, and a name of a second repeater station to which a destination communication apparatus belongs, wherein the name of the first repeater is associated with identification information of the first repeater and the name of the second repeater is associated with identification information of the second repeater;
- an information retrieving step of
- retrieving names of the repeater stations matching with the names of the first and the second repeater stations inputted from the input step, and then identification information of the repeater stations and identification information of the gateways based on the retrieved names of the repeater stations in the communication path setting information, and
- acquiring the retrieved identification information as identification information of the first repeater station, identification information of the second repeater station, identification information of the gateway to which the first repeater station belongs and identification information of the gateway to which the second repeater station belongs;
- a gateway determining step of determining whether the retrieved identification information of the gateway to which the first repeater station belongs matches with the retrieved identification information of the gateway to which the second repeater station belongs; and
- a communication frame generating step of generating a communication frame which includes information regarded as identification information of the source repeater station and information regarded as identification information of the destination repeater station, wherein the communication frame generating step generates the communication frame by setting the retrieved identification information of the first repeater station as information regarded as identification information of the source repeater station included in the communication frame, setting the retrieved identification information of the second repeater station as information regarded as identification information of the destination repeater station included in the communication frame when the gateway determining step determines that the retrieved identification information of the gateway to which the first repeater station belongs matches with the retrieved identification information of the gateway to which the second repeater station belongs, and setting the retrieved identification information of the gateway to which the first repeater station belongs as information regarded as identification information of the destination repeater station included in the communication frame when the gateway determining step determines that there is no match, wherein the name of the second repeater station inputted from the input unit is inputted as information specifying at least identification information of the destination communication apparatus;

the communication frame includes information regarded as identification information of the destination communication apparatus; and the communication frame generating section is further configurable to set identification information of an unspecified radio device, which is the identification information indicating that the destination communication apparatus is the unspecified radio device, as information regarded as identification information of the destination communication apparatus included in the communication frame when the gateway determining section determines that the identification information of the gateway to which the first repeater station belongs matches with the identification information of the gateway to which the second repeater station belongs, and the communication frame generating section is further configurable to set information including the retrieved identification information of the second repeater station as information regarded as identification information of the destination communication apparatus included in the communication frame when the gateway determining section determines that there is no match.

* * * * *